(12) United States Patent
Huang

(10) Patent No.: US 6,715,901 B2
(45) Date of Patent: Apr. 6, 2004

(54) IMAGE PROJECTOR SYSTEM HAVING A LIGHT SOURCE THAT INCLUDES AT LEAST FOUR LIGHT EMITTING DIODE MODULES

(76) Inventor: Shi-Hwa Huang, 2F, No. 14, Lane 133, Chung-Yang Rd., Hsin-Tien City, Taipei Hsien (TW)

( * ) Notice: Subject to any disclaimer, the term of this patent is extended or adjusted under 35 U.S.C. 154(b) by 0 days.

(21) Appl. No.: 10/404,217

(22) Filed: Mar. 31, 2003

(65) Prior Publication Data

US 2004/0032736 A1 Feb. 19, 2004

(30) Foreign Application Priority Data

Aug. 15, 2002 (TW) .......................... 91118458 A

(51) Int. Cl.[7] .......................... F21V 29/00; G03B 21/00
(52) U.S. Cl. .......................... 362/294; 362/800; 257/88; 353/31; 353/97; 345/39; 345/82; 345/83
(58) Field of Search .......................... 362/227, 240, 362/241, 294, 341, 346, 373, 555, 800; 353/31, 52, 85, 97, 99, 122; 352/198; 257/706, 707, 81, 82, 720, 88–93, 99; 345/39, 46, 82, 83

(56) References Cited

U.S. PATENT DOCUMENTS

| | | | | |
|---|---|---|---|---|
| 5,660,461 A | * | 8/1997 | Ignatius et al. | 362/241 |
| 5,857,767 A | * | 1/1999 | Hochstein | 362/294 |
| 6,045,240 A | * | 4/2000 | Hochstein | 362/294 |
| 6,452,217 B1 | * | 9/2002 | Wojnarowski et al. | 257/99 |
| 6,547,400 B1 | * | 4/2003 | Yokoyama | 353/98 |
| 6,578,986 B2 | * | 6/2003 | Swaris et al. | 362/249 |
| 6,623,126 B2 | * | 9/2003 | Sekiguchi et al. | 353/62 |

* cited by examiner

Primary Examiner—Russell Adams
Assistant Examiner—Michael Dalakis
(74) Attorney, Agent, or Firm—Townsend and Townsend and Crew LLP

(57) ABSTRACT

An image projector system includes a light source, a light-modulating device, and a projector lens set. The light source includes a rectangular housing formed with a light-transmissive output port and at least four light-transmissive input ports, at least four light emitting diode modules, and a mirror set mounted in the housing for directing light beam outputs of the light emitting diode modules that are transmitted into the housing through the light-transmissive input ports to pass through the light-transmissive output port for processing by the light-modulating device. The light beam output of each of the light emitting diode modules has a wavelength band within a range of from 400 to 700 nanometers, that is different from the other light emitting diode modules and that has a center wavelength spaced apart from that of the other light emitting diode modules by at least 20 nanometers.

21 Claims, 13 Drawing Sheets

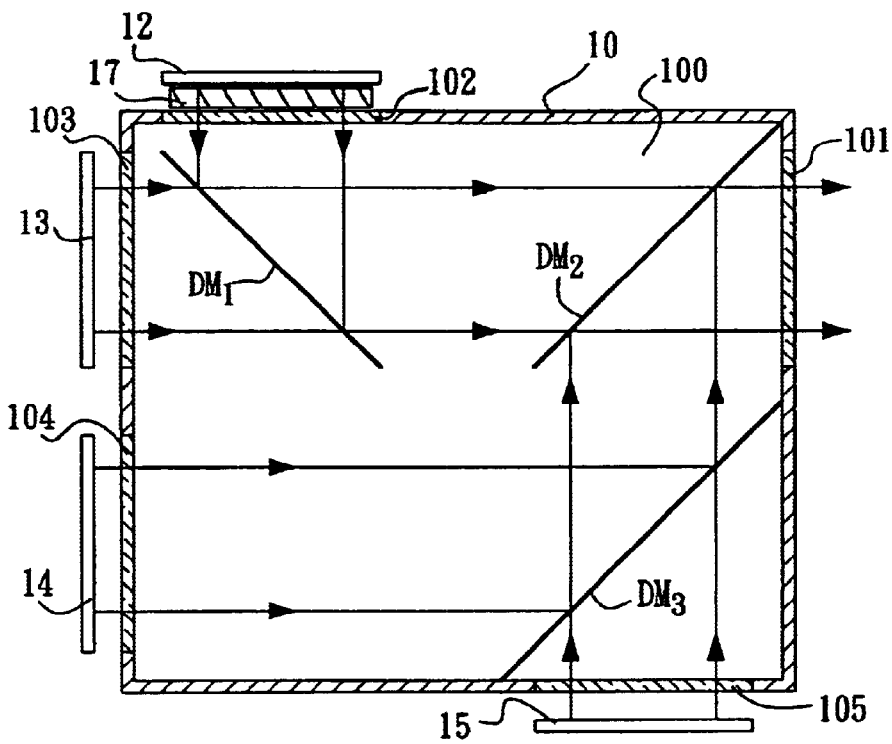
F I G. 2
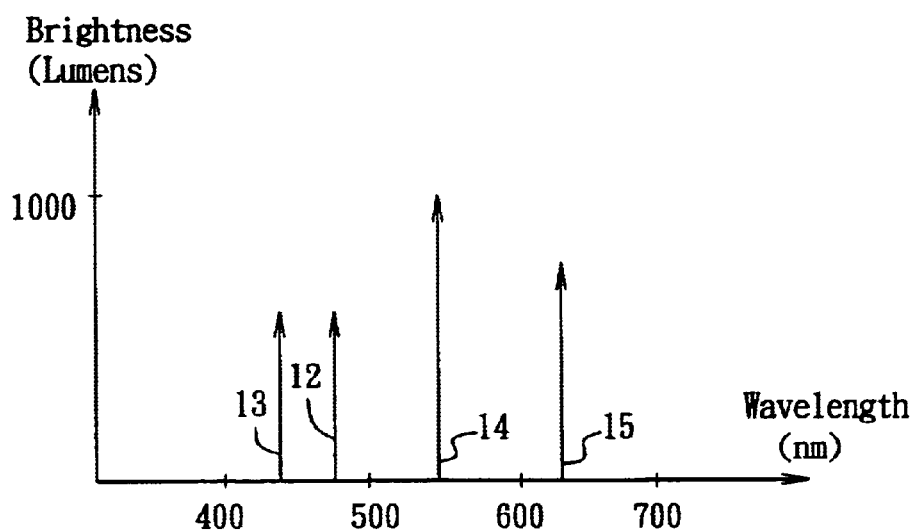
F I G. 3

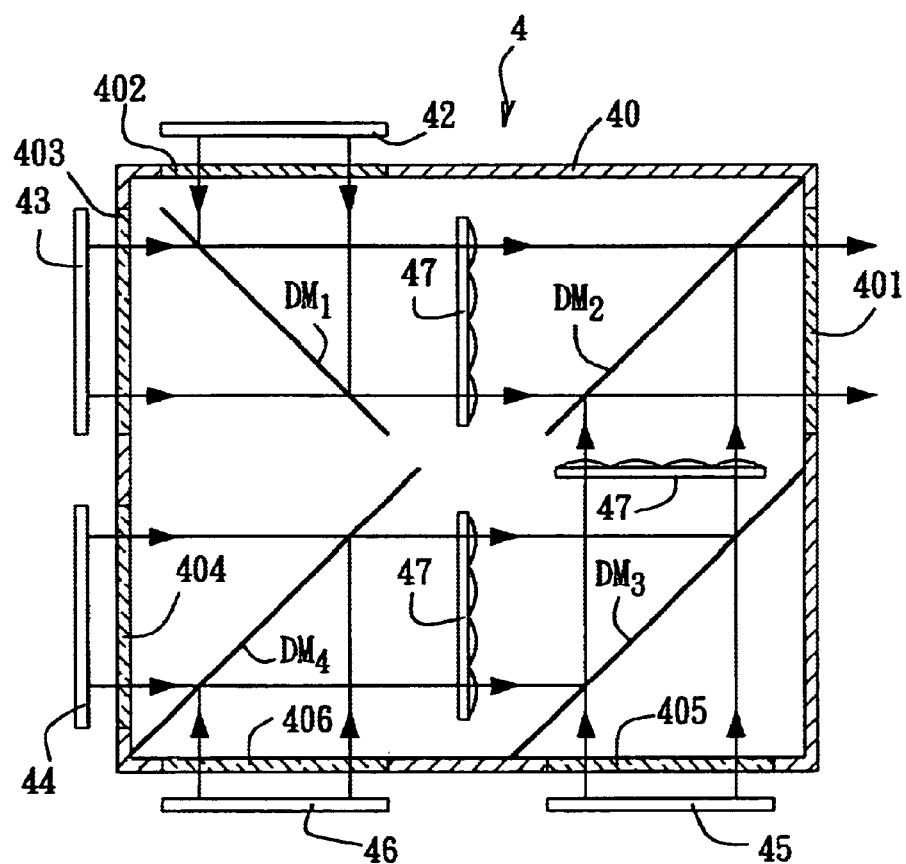
F I G. 9

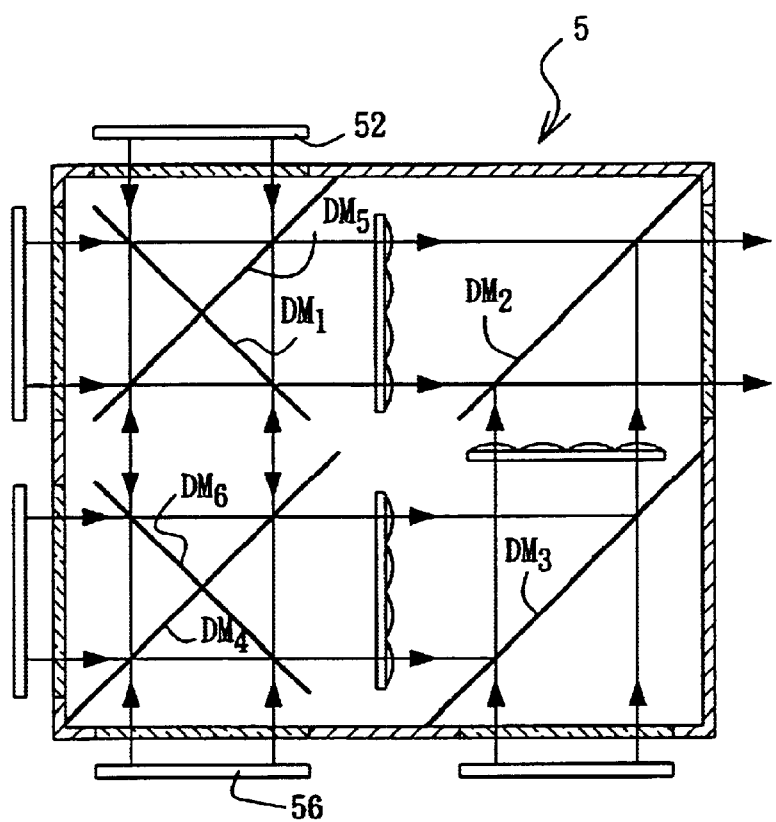
F I G. 11

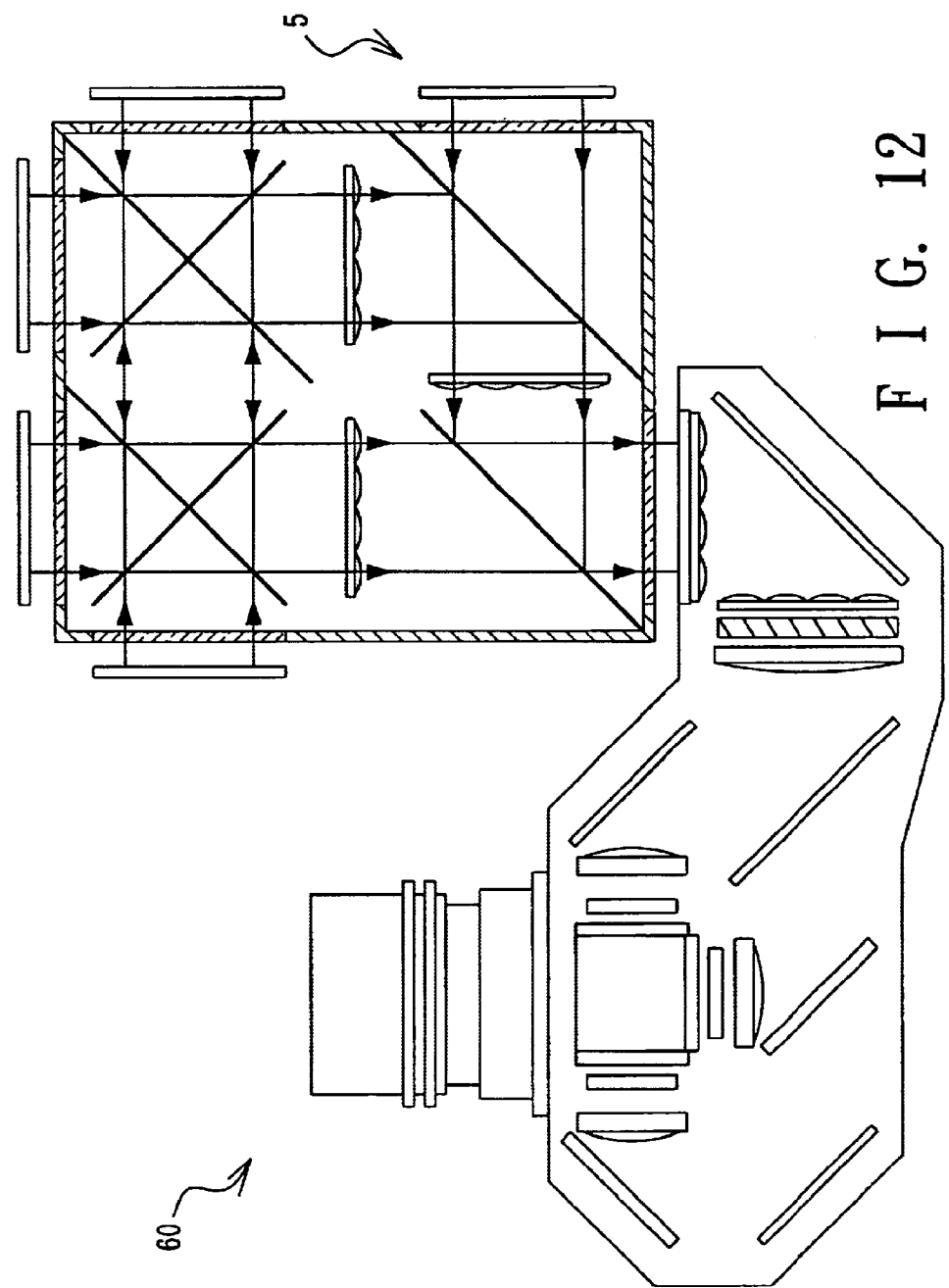
F I G. 12

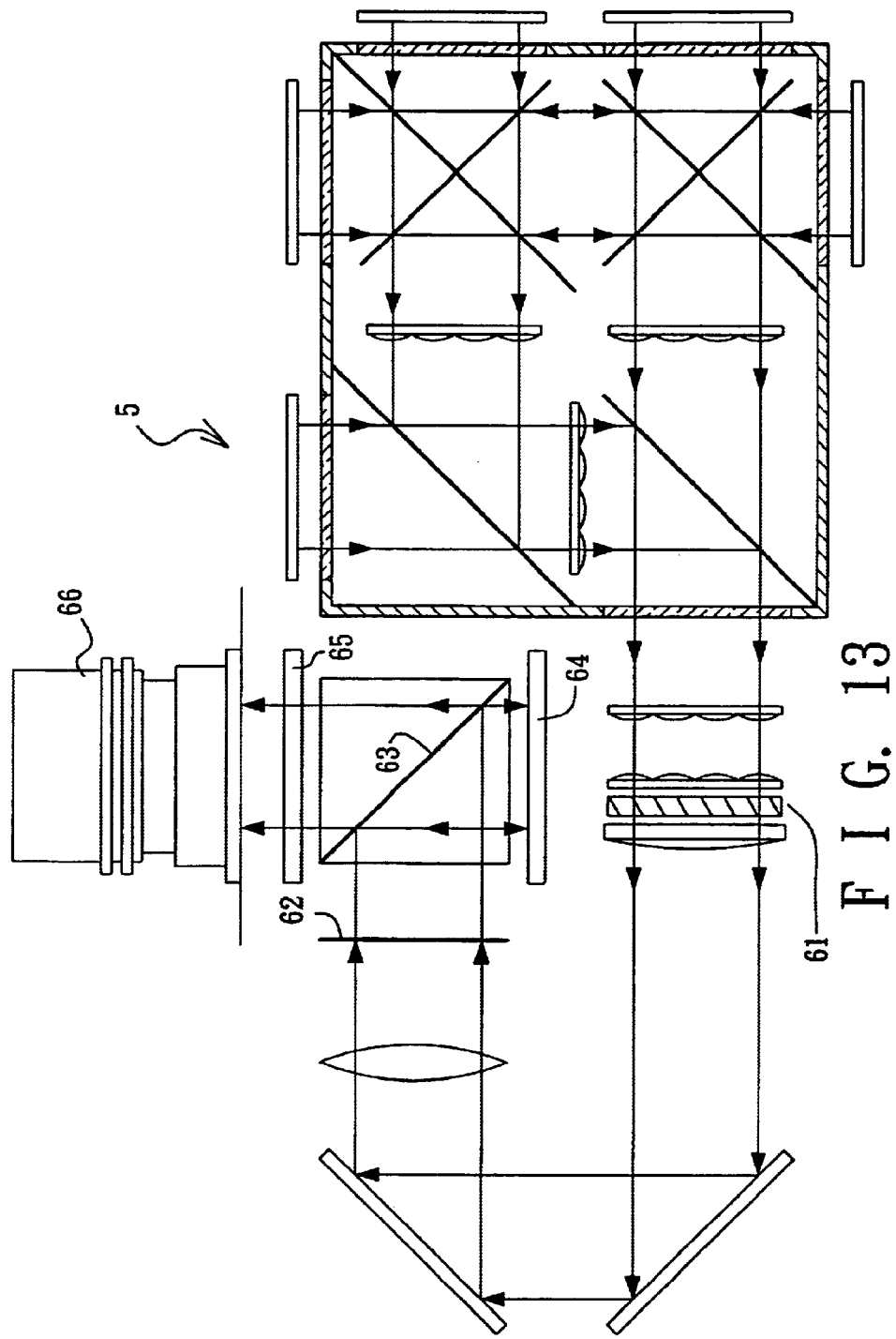
F I G. 13

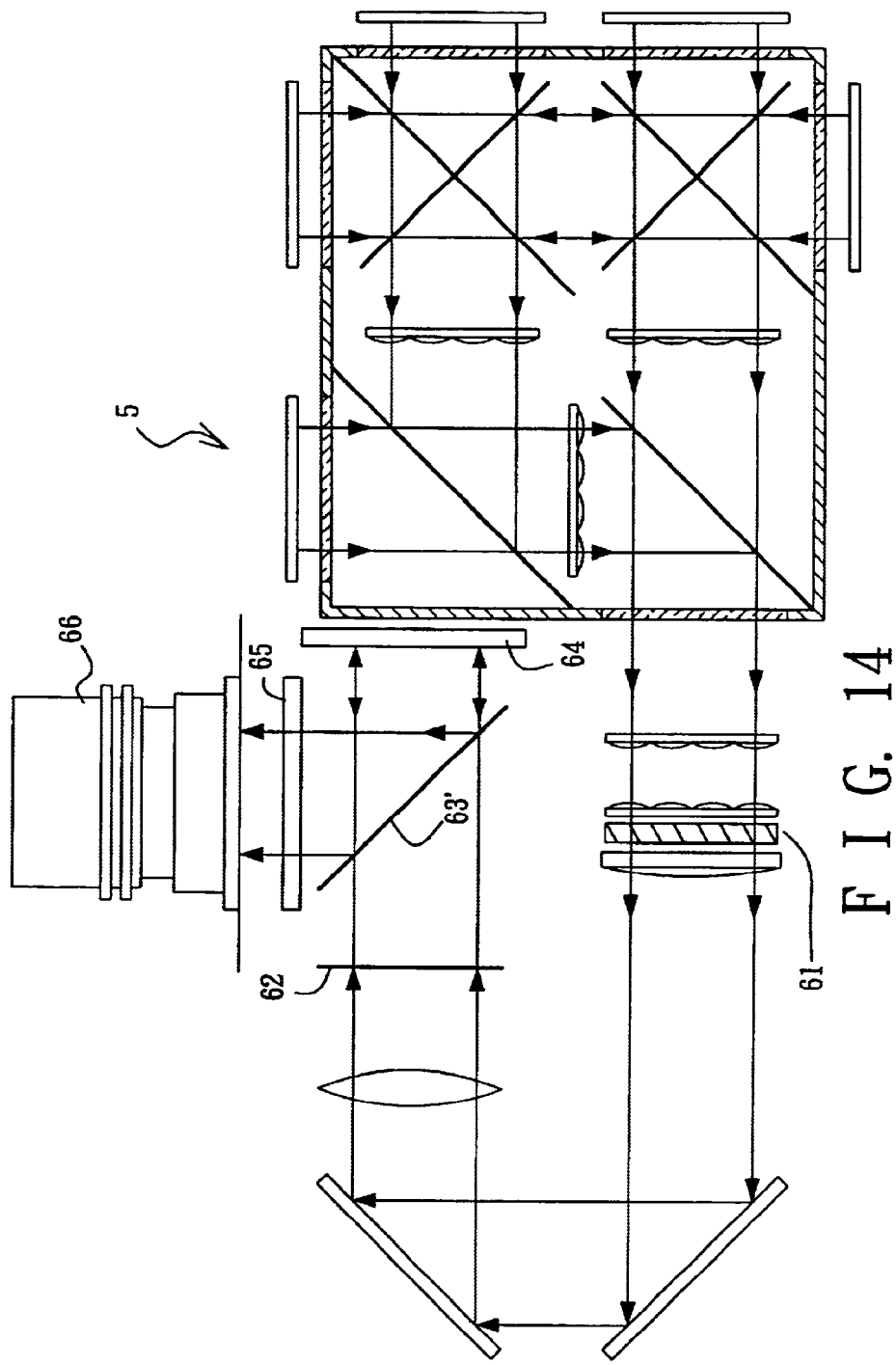

IMAGE PROJECTOR SYSTEM HAVING A LIGHT SOURCE THAT INCLUDES AT LEAST FOUR LIGHT EMITTING DIODE MODULES

CROSS-REFERENCE TO RELATED APPLICATION

This application claims priority of Taiwanese Application No. 091118458, filed on Aug. 15, 2002.

BACKGROUND OF THE INVENTION

1. Field of the Invention

The invention relates to an image projector system, more particularly to an image projector system having a light source that includes at least four light emitting diode modules.

2. Description of the Related Art

As shown in FIG. 1, a conventional image projector system includes a light source 90, a light-modulating device 91 for modulating light generated by the light source 90, and a projector lens set 92 for projecting modulated light from the light-modulating device 91 onto a screen (not shown). The power of projected modulated light beams that contain image data must be sufficiently high so that bright and clear images can be shown on the screen. A high-voltage mercury lamp 900 is widely used as the light source 90 for generating a high-intensity light beam. As a side effect, high temperatures are generated that not only cause deterioration and shortening of the service life of ambient components, but also degrade the lamp terminals. When the lamp terminals are degraded, the input voltage might not be sufficient to start the lamp 900. As a result, frequent replacement of the expensive high-voltage mercury lamp 900 must be conducted.

Furthermore, since the output of the high-voltage mercury lamp 900 includes large amounts of ultraviolet and infrared light, a number of optical filters must be disposed in the optical path within the image projector system. However, the presence of the optical filters can on the one hand abate the power of light beams projected by the image projector system, and on the other hand still allow a small percentage of the ultraviolet and infrared light to pass therethrough. As ultraviolet light tends to damage optical components in the optical path by virtue of its high-powered photons, and as infrared light tends to degrade optical components by virtue of heat rendered thereby, the presence of both ultraviolet and infrared light can shorten the service life of components of the image projector system.

Moreover, as observed in the color spectrum visible to the human eyes, the optimum wavelength for green light should be 525 nanometers. However, in view of limitations in light spectrum inherent to the high-voltage mercury lamp 900, the wavelength of green light rendered by the lamp 900 is around 550 nanometers. Furthermore, in the analysis of light-sensitive effect of human eyes, it was found that the intensity of green light is closely related to that of a whole range of light being sensed by the human eye. In other words, when the wavelength of rendered green light deviates from the optimum value of 525 nanometers, the presentability and intensity of composite light will be adversely affected. Another drawback of the high-voltage mercury lamp 900 resides in that, when the lamp 900 is turned on, the three primary colors, i.e., red, green and blue, must be emitted simultaneously. The primary colors cannot be sequentially emitted in a series of clock intervals. Therefore, since the image projector system must apply the technique of simultaneous display of red, green and blue color components, use of a single-packaged liquid crystal modulator is not possible.

Moreover, the transitory duration during turning on or turning off of the high-voltage mercury lamp 900 may require several hundreds of milliseconds or even reach several seconds. Since persistence of vision for human eyes only takes $\frac{1}{15}$ second, cyclic turning on and turning off of the lamp 900 will be perceived as discontinuous image rendering. As such, during use of the conventional image projector system, the high-voltage mercury lamp 900 must always be turned on, and cannot be momentarily turned off for lowering the operating temperature.

On the other hand, light emitting diodes not only have the advantages of light beams with smaller divergent angles and a wider range of available wavelengths for light emission, but also allow selective emission of differently colored light. As such, light emitting diodes of different colors can take turns in being applied with strong current for lowering the operating temperature. The power conversion efficiency of red light emitting diodes made by more mature manufacturing technology can be as high as 55%, while those of yellow-green light emitting diodes can be 32%. In view of the foregoing, light emitting diodes are more ideal candidates to serve as a light source for image projector systems than high-voltage mercury lamps. The only concern is that, in general, a light emitting diode can only emit light having several lumens, far less than the requirement of over a thousand lumens by the conventional liquid crystal image projector system.

SUMMARY OF THE INVENTION

Therefore, the main object of the present invention is to provide a light source that includes at least four light emitting diode modules for use in an image projector system to overcome the aforesaid drawbacks associated with the prior art.

Another object of the present invention is to provide an image projector system that incorporates the aforesaid light source.

According to one aspect of the present invention, there is provided a light source for an image projector system. The light source comprises:

a rectangular housing formed with a light-transmissive output port and at least four light-transmissive input ports;

at least four light emitting diode modules, each of which is mounted externally of the housing adjacent to a respective one of the light-transmissive input ports, each of the light emitting diode modules generating a light beam output that is transmitted into the housing through the respective one of the light-transmissive input ports, the light beam output of each of the light emitting diode modules having a wavelength band within a range of from 400 to 700 nanometers, the wavelength bands of the light beam outputs of the light emitting diode modules being different from each other, wherein a center wavelength of the wavelength band of the light beam output of each of the light emitting diode modules is spaced apart from that of other ones of the light emitting diode modules by at least 20 nanometers; and a mirror set mounted in the housing for directing the light beam outputs of the light emitting diode modules that are transmitted into the housing to pass through the light-transmissive output port.

According to another aspect of the present invention, there is provided an image projector system that includes a light source, a light-modulating device for modulating light generated by the light source, and a projector lens set for projecting modulated light from the light-modulating device onto a screen. The light source includes:

a rectangular housing formed with a light-transmissive output port and at least four light-transmissive input ports;

at least four light emitting diode modules, each of which is mounted externally of the housing adjacent to a respective one of the light-transmissive input ports, each of the light emitting diode modules generating a light beam output that is transmitted into the housing through the respective one of the light-transmissive input ports, the light beam output of each of the light emitting diode modules having a wavelength band within a range of from 400 to 700 nanometers, the wavelength bands of the light beam outputs of the light emitting diode modules being different from each other, wherein a center wavelength of the wavelength band of the light beam output of each of the light emitting diode modules is spaced apart from that of other ones of the light emitting diode modules by at least 20 nanometers;

the light beam output of one of the light emitting diode modules corresponding to a red color output, the light beam output of one of the light emitting diode modules corresponding to a green color output, the light beam output of one of the light emitting diode modules corresponding to a blue color output; and a mirror set mounted in the housing for directing the light beam outputs of the light emitting diode modules that are transmitted into the housing to pass through the light-transmissive output port for processing by the light-modulating device.

BRIEF DESCRIPTION OF THE DRAWINGS

Other features and advantages of the present invention will become apparent in the following detailed description of the preferred embodiments with reference to the accompanying drawings, of which:

FIG. 2 is a schematic diagram of a first preferred embodiment of a light source according to the present invention;

FIG. 3 illustrates a wavelength band distribution of light beam outputs generated by the light source of the first preferred embodiment shown in FIG. 2;

FIG. 9 is a schematic diagram of a second preferred embodiment of a light source according to the present invention;

FIG. 11 is a schematic diagram of a third preferred embodiment of a light source according to the present invention;

FIG. 12 is a schematic diagram showing a liquid crystal image projector system according to the present invention;

FIG. 13 is a schematic diagram showing another liquid crystal image projector system according to the present invention; and FIG. 14 is a schematic diagram showing yet another liquid crystal image projector system according to the present invention.

DETAILED DESCRIPTION OF THE PREFERRED EMBODIMENTS

Figure 1:
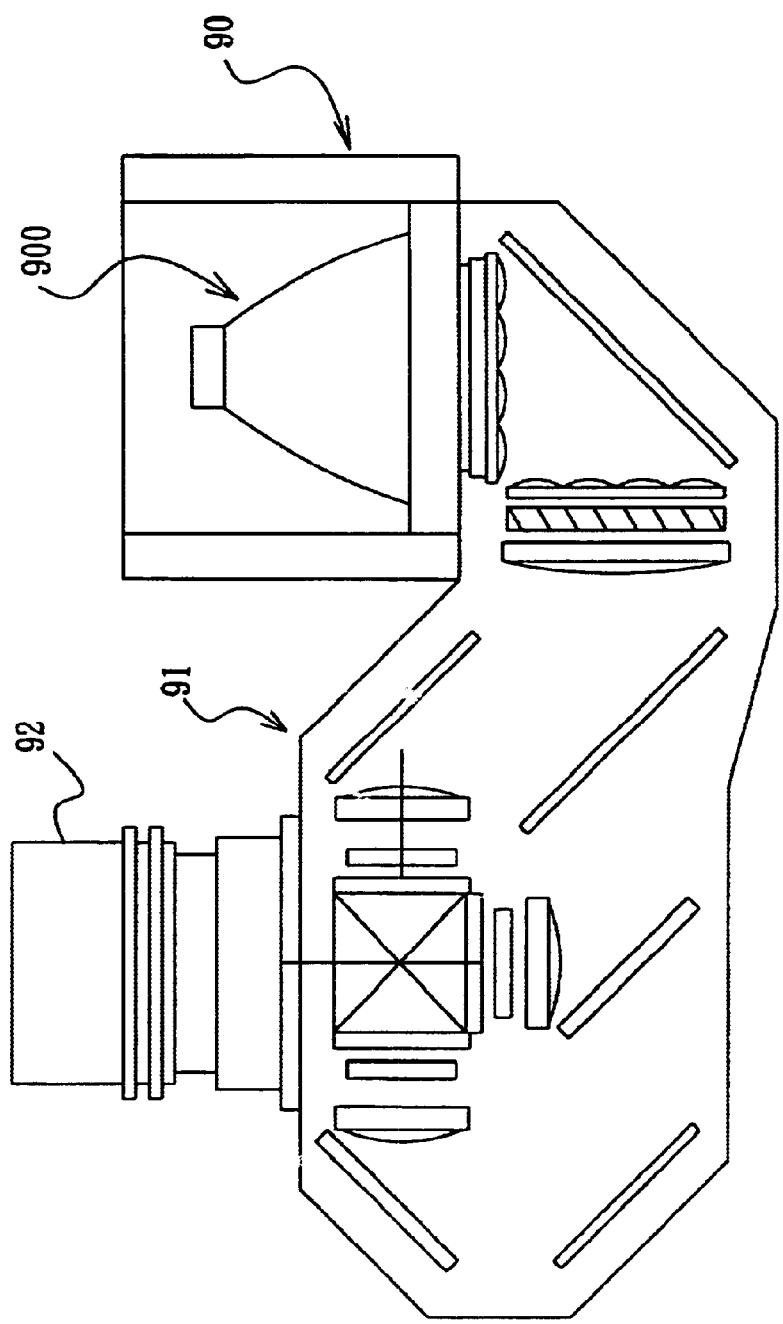
FIG. 1 is a schematic diagram of a conventional image projector system.

FIG. 2 illustrates the first preferred embodiment of a light source 1 for an image projector system according to the present invention. The light source 1 is shown to include a rectangular housing 10 formed with a rectangular cavity 100. For efficient use of space, the cavity 100 is preferably cubic in shape. The rectangular housing 10 is further formed with a light-transmissive output port 101 located at an upper portion of a right lateral side of the housing 10, a first light-transmissive input port 102 located at a left portion of an upper lateral side of the housing 10, a second light-transmissive input port 103 located at an upper portion of a left lateral side of the housing 10, a third light-transmissive input port 104 located at a lower portion of the left lateral side of the housing 10, and a fourth light-transmissive input port 105 located at a right portion of a lower lateral side of the housing 10. In this embodiment, four light emitting diode modules 12, 13, 14, 15 are mounted externally of the housing 10 adjacent to a respective one of the light-transmissive input ports 102, 103, 104, 105 such that each of the light emitting diode modules 12, 13, 14, 15 generates a light beam output that is transmitted into the cavity 100 of the housing 10 through the respective one of the light-transmissive input ports 102, 103, 104, 105. At present, since the manufacturing technology of red light emitting diodes is the most mature, the light emitting efficiency and intensity thereof are the best. Therefore, as shown in FIG. 3, only one red light emitting diode module 15 having a wavelength band corresponding to red visible light is needed among the four light emitting diode modules 12, 13, 14, 15. In this embodiment, the center wavelength of the wavelength band of the light beam output of the red light emitting diode module 15 is around 625 nanometers.

Although green light emitting diodes have lower light emitting efficiency and intensity than red light emitting diodes, since human eyes are highly sensitive to green light, the light source 1 of this embodiment utilizes only one green light emitting diode module 14. As shown in FIG. 3, the center wavelength of the wavelength band of the light beam output of the green light emitting diode module 14 in this embodiment is 515 nanometers. Moreover, since blue light emitting diodes have rather low light emitting efficiency and intensity than red light emitting diodes, and since human eyes are less sensitive to blue light as compared to green light, the light source 1 of this embodiment utilizes a pair of blue light emitting diode modules 12, 13 to result in sufficient blue light intensity. As shown in FIG. 3, the center wavelengths of the wavelength bands of the light beam outputs of the blue light emitting diode modules 12, 13 in this embodiment are 480 and 455 nanometers, respectively.

Figure 4:
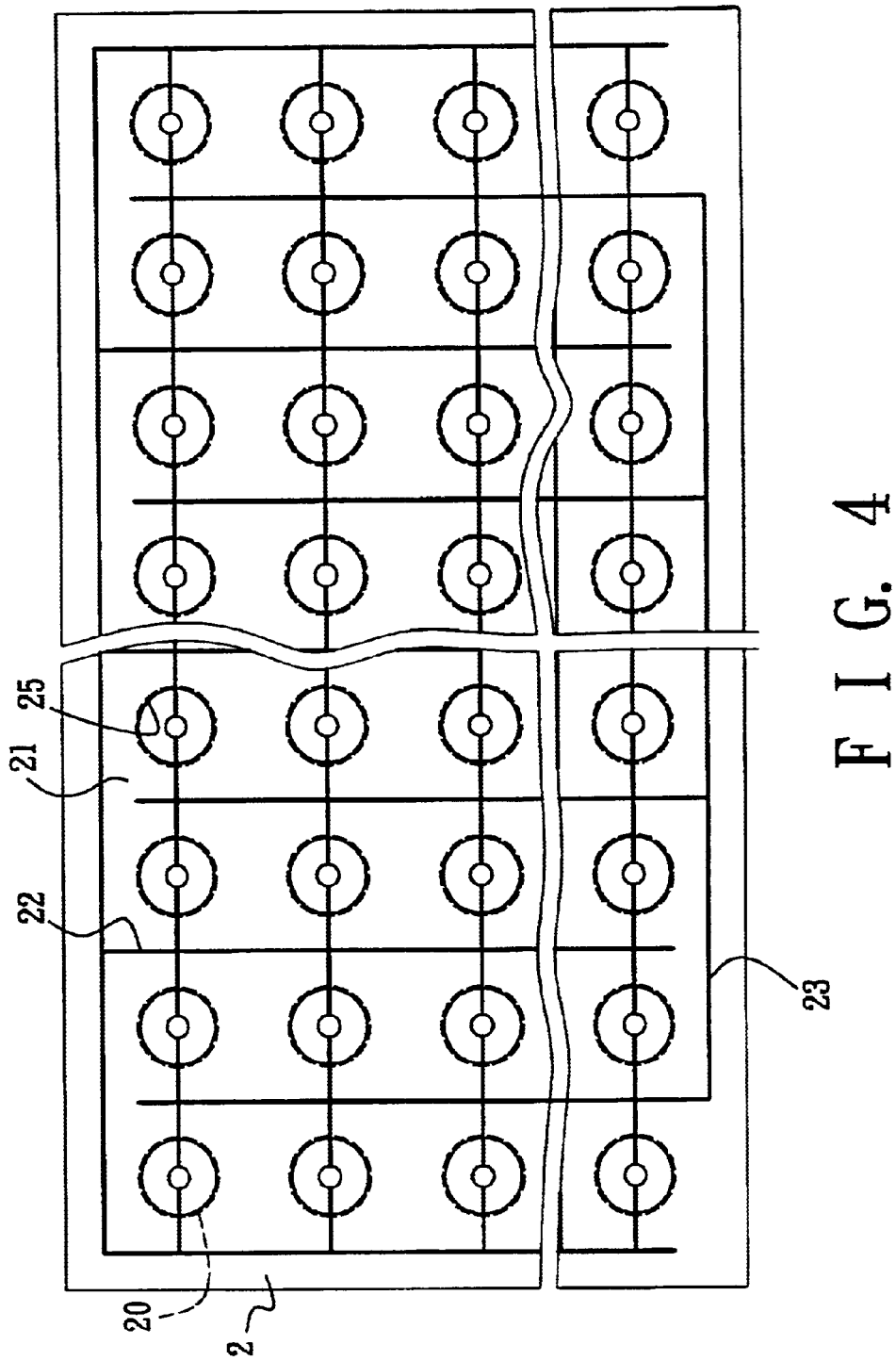
FIG. 4 is a top view showing a light emitting diode module of the light source of the first preferred embodiment.
Figure 5:
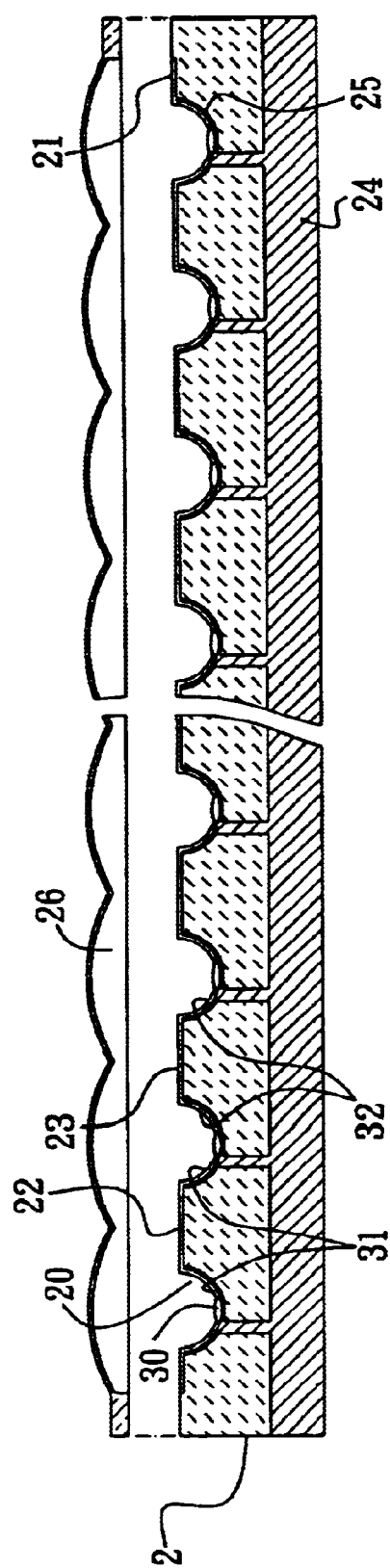
FIG. 5 is a sectional view of the light emitting diode module of FIG. 4.

Each of the light emitting diode modules 12, 13, 14, 15 includes a plurality of light emitting diodes, the light beams generated by the diodes in the same one of the light emitting diode modules 12, 13, 14, 15 having a substantially uniform wavelength band. As shown in FIGS. 4 and 5, each light emitting diode module includes a ceramic substrate 2 having a front side 21 and a rear side. The front side 21 is formed with an array of diode receiving cavities 20. Each of the cavities 20 is formed with a reflective layer 25 for increasing the light emitting efficiency. The rear side is formed with a plurality of holes that extend respectively toward the reflective layers 25 in the cavities 20. Each light emitting diode module further includes an array of light emitting semiconductor diodes 30, each of which is mounted on and is insulated from the reflective layer 25 of a respective one of the cavities 20 in the front side 21 of the substrate. Each of the semiconductor diodes 30 has first and second diode terminals 31, 32. The front side 21 of the substrate 2 is formed with a first circuit 22, in the form of conductive fingers, connected to the first diode terminals 31 of the semiconductor diodes 30, and a second circuit 23, also in the form of conductive fingers that are interleaved with the conductive fingers of the first circuit 22, connected to the second diode terminals 32 of the semiconductor diodes 30. To prevent overheating of the semiconductor diodes 30, in this embodiment, a metal heat dissipating member 24 is mounted on the rear side of the substrate 2 and extends into the holes in the substrate 2 to establish thermal conduction with the reflective layers 25 in the cavities 21. An active cooling apparatus, such as a cooling pipe (not shown), may be disposed under the heat dissipating member 24 to enhance the cooling effect, thereby effectively lowering the temperature of the working environment of the semiconductor diodes 30.

Preferably, a lens member 26 is mounted on the front side 21 of the substrate 2. The lens member 26 is formed with a plurality of convex sections, each of which corresponds to a respective one of the semiconductor diodes 30 for converging light beams emitted by the latter.

Figure 6:
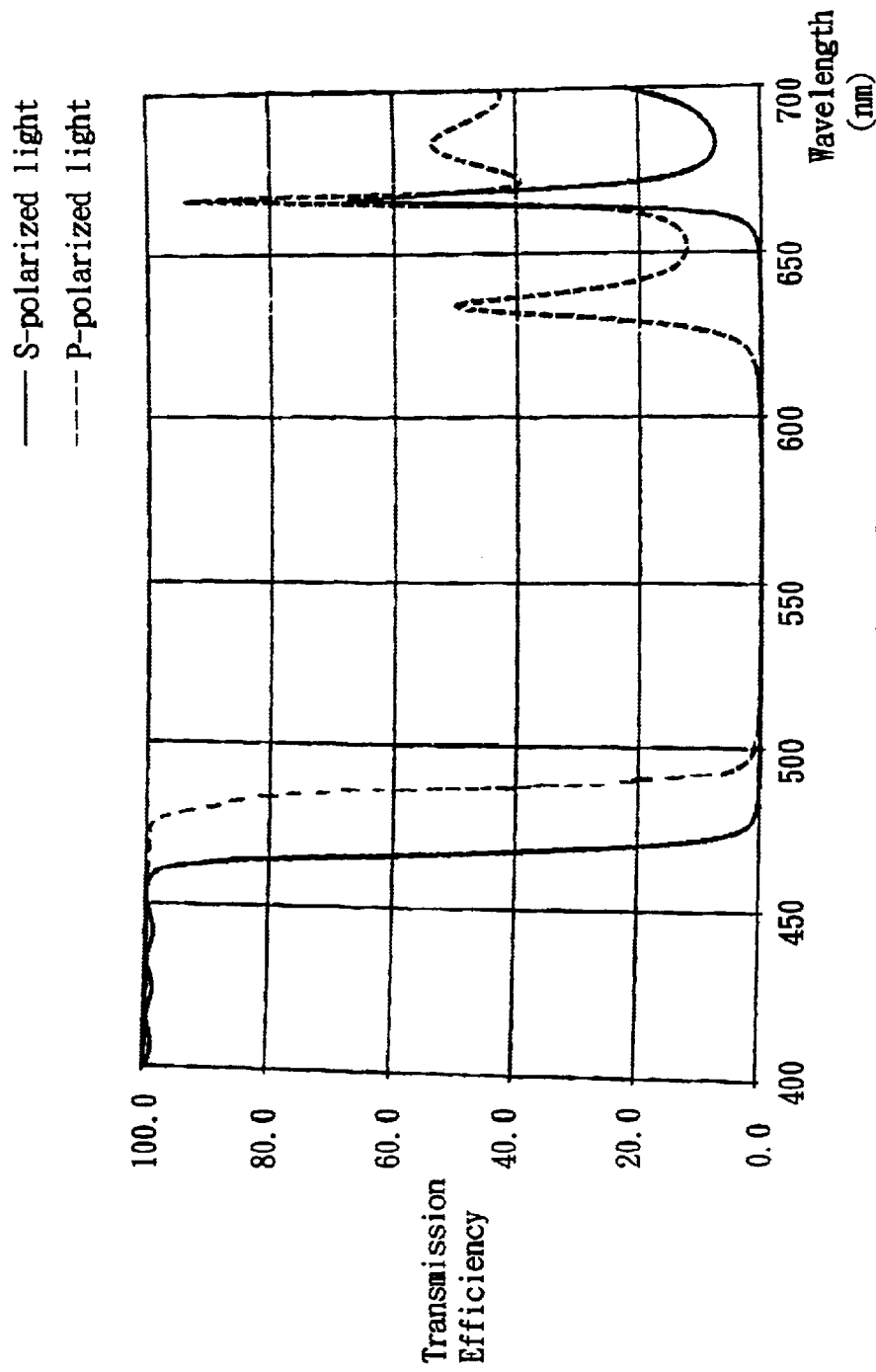
FIGS. 6 to 8 respectively illustrate the behavior of first, second and third dichroic mirrors used in the first preferred embodiment shown in FIG. 2.

Referring once again to FIG. 2, a first dichroic mirror (DM1) is disposed in the cavity 100, and is adjacent to and is incline data 45-degree angle relative to the light-transmissive input ports 102, 103. With further reference to FIG. 6, in general, the first dichroic mirror (DM1) allows s-polarized light having a wavelength not greater than 465 nanometers to pass therethrough, and allows p-polarized light having a wavelength not greater than 485 nanometers to pass therethrough. Since the center wavelength of the wavelength band of the light beam output of the blue light emitting diode module 12 is around 480 nanometers, when the light beam output of the blue light emitting diode module 12 is s-polarized, the s-polarized light beam output of the blue light emitting diode module 12 will be reflected by the first dichroic mirror (DM1) toward the light-transmissive output port 101. To this end, a polarization state converter 17 is disposed between the blue light emitting diode module 12 and the light-transmissive input port 102 to ensure that the light beam output of the blue light emitting diode module 12 is s-polarized when entering into the cavity 100. On the other hand, since the center wavelength of the wavelength band of the light beam output of the blue light emitting diode module 13 is around 455 nanometers, the first dichroic mirror (DM1) allows the light beam output of the blue light emitting diode-module 13 to pass therethrough regardless of the polarization state of the same. The first dichroic mirror (DM1) is thus able to direct the light beam outputs of the blue light emitting diode modules 12, 13 toward the light-transmissive output port 102.

Figure 8:
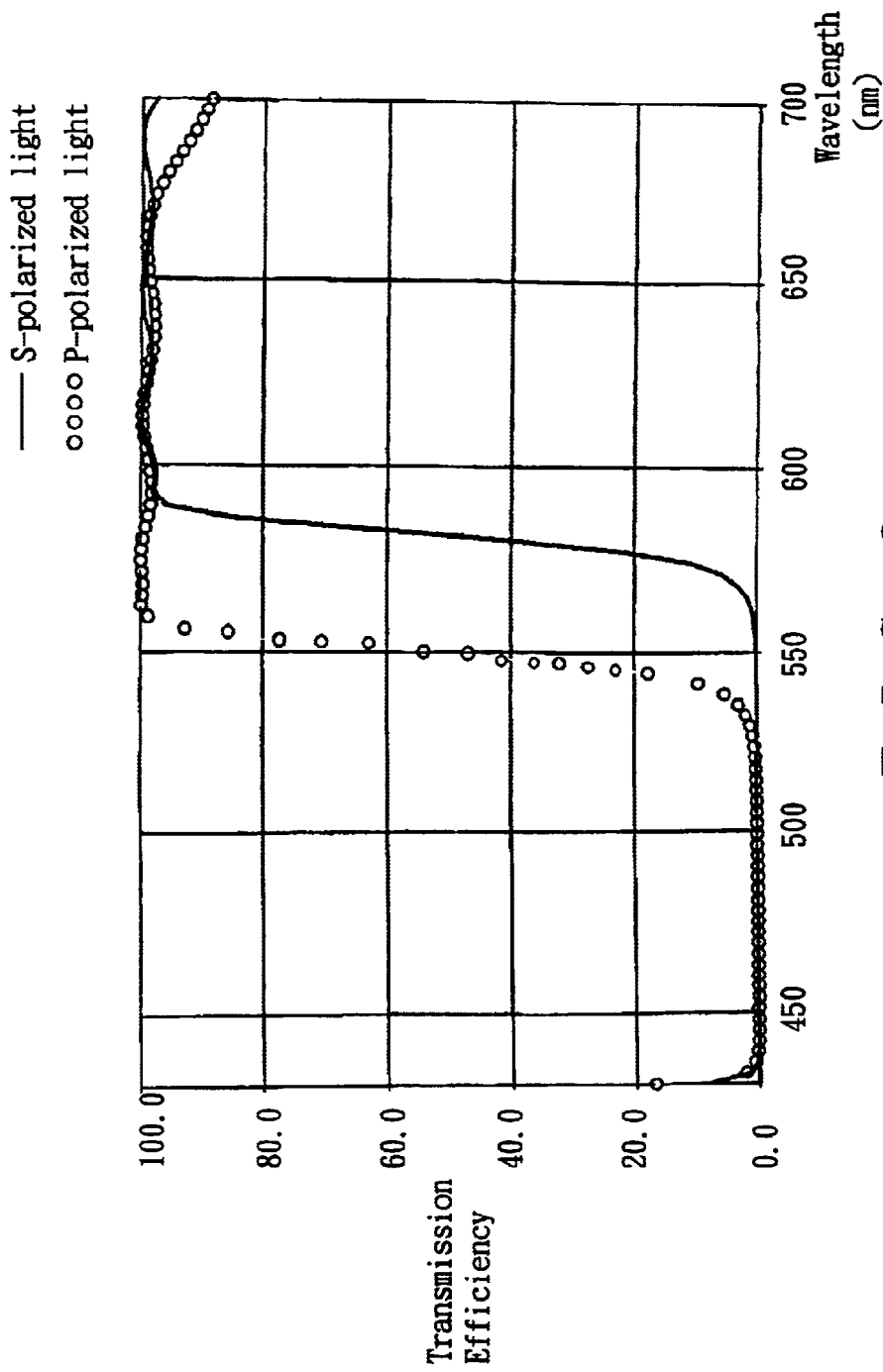

A third dichroic mirror (DM3) is disposed in the cavity 100, and is adjacent to and is inclined at a 45-degree angle relative to the light-transmissive input port 105. With further reference to FIG. 8, since the center wavelength of the wavelength band of the light beam output of the green light emitting diode module 14 is around 515 nanometers, which is less than the wavelength boundary points of the third dichroic mirror (DM3) (around 550 nanometers for p-polarized light and around 580 nanometers for s-polarized), the light beam output of the green light emitting diode module 14 will be reflected upwardly by the third dichroic mirror (DM3) regardless of the polarization state of the same. Moreover, since the center wavelength of the wavelength band of the light beam output of the red light emitting diode module 15 is around 625 nanometers, which is greater than the aforesaid wavelength boundary points of the third dichroic mirror (DM3), the light beam output of the red light emitting diode module 15 will be allowed to pass through the third dichroic mirror (DM3) regardless of the polarization state of the same.

Figure 7:
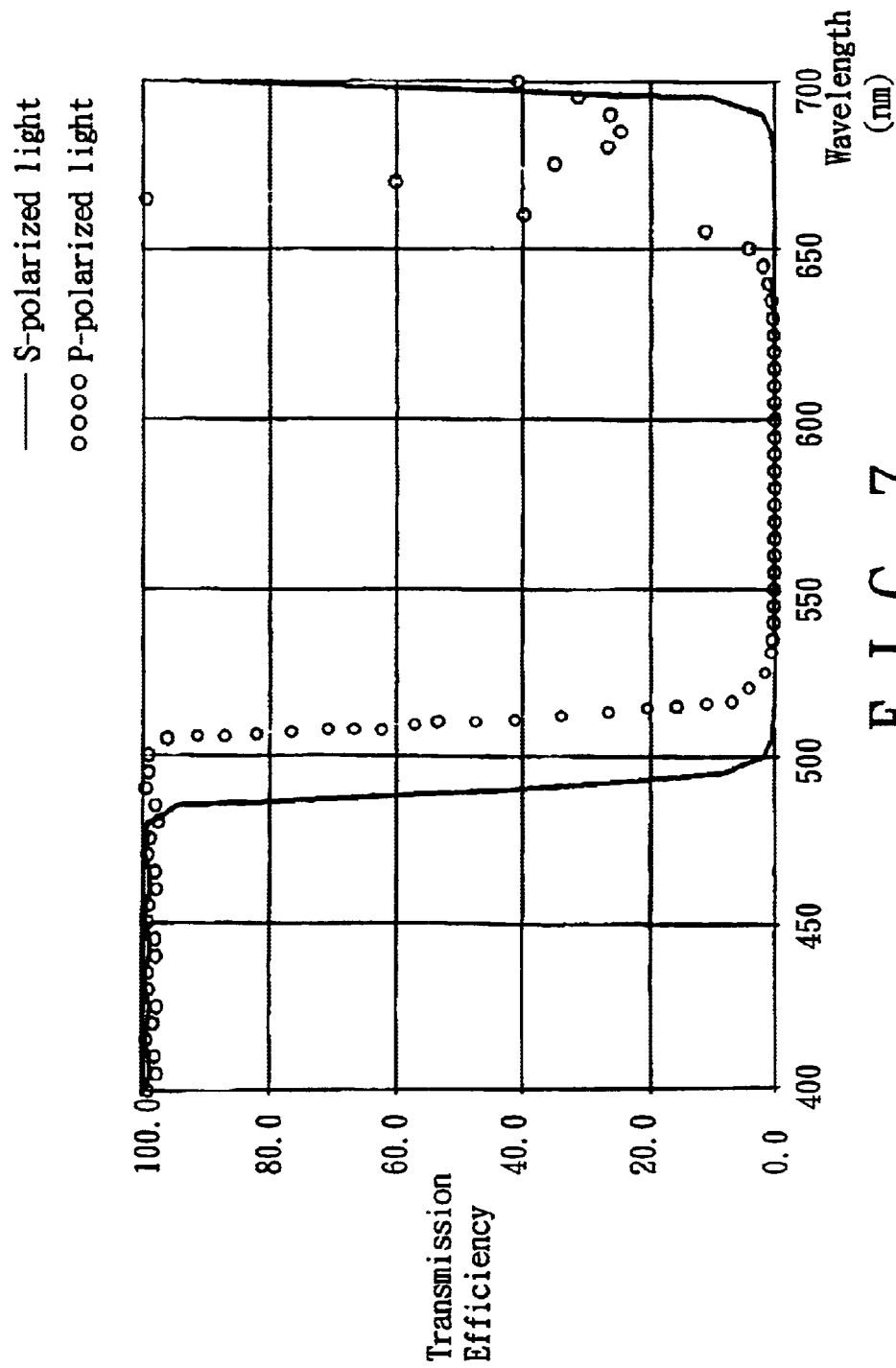

The blue light from the first dichroic mirror (DM1) is integrated with the green and red light from the third dichroic mirror (DM3) using a second dichroic mirror (DM2), which is disposed in the cavity 100 and which is adjacent to and which is inclined at a 45-degree angle relative to the light-transmissive output port 101. With further reference to FIG. 7, in general, the second dichroic mirror (DM2) allows s-polarized light having a wavelength not greater than 490 nanometers to pass therethrough, and allows p-polarized light having a wavelength not greater than 510 nanometers to pass therethrough. Since the center wavelengths of the light beam outputs of the blue light emitting diode modules 12, 13, i.e., 480 and 455 nanometers, are less than the wavelength boundary points of the second dichroic mirror (DM2), the second dichroic mirror (DM2) will allow passage of the blue light beam outputs therethrough for output through the light-transmissive output port 101 of the housing 10. Moreover, since the center wavelengths of the green and red light beam outputs of the light emitting diode modules 14, 15, i.e., 515 nanometers and 625 nanometers, are greater than the wavelength boundary points of the second dichroic mirror (DM2), the second dichroic mirror (DM2) will reflect the red and green light beam outputs for passage through the light-transmissive output port 101 of the housing 10.

Figure 10:
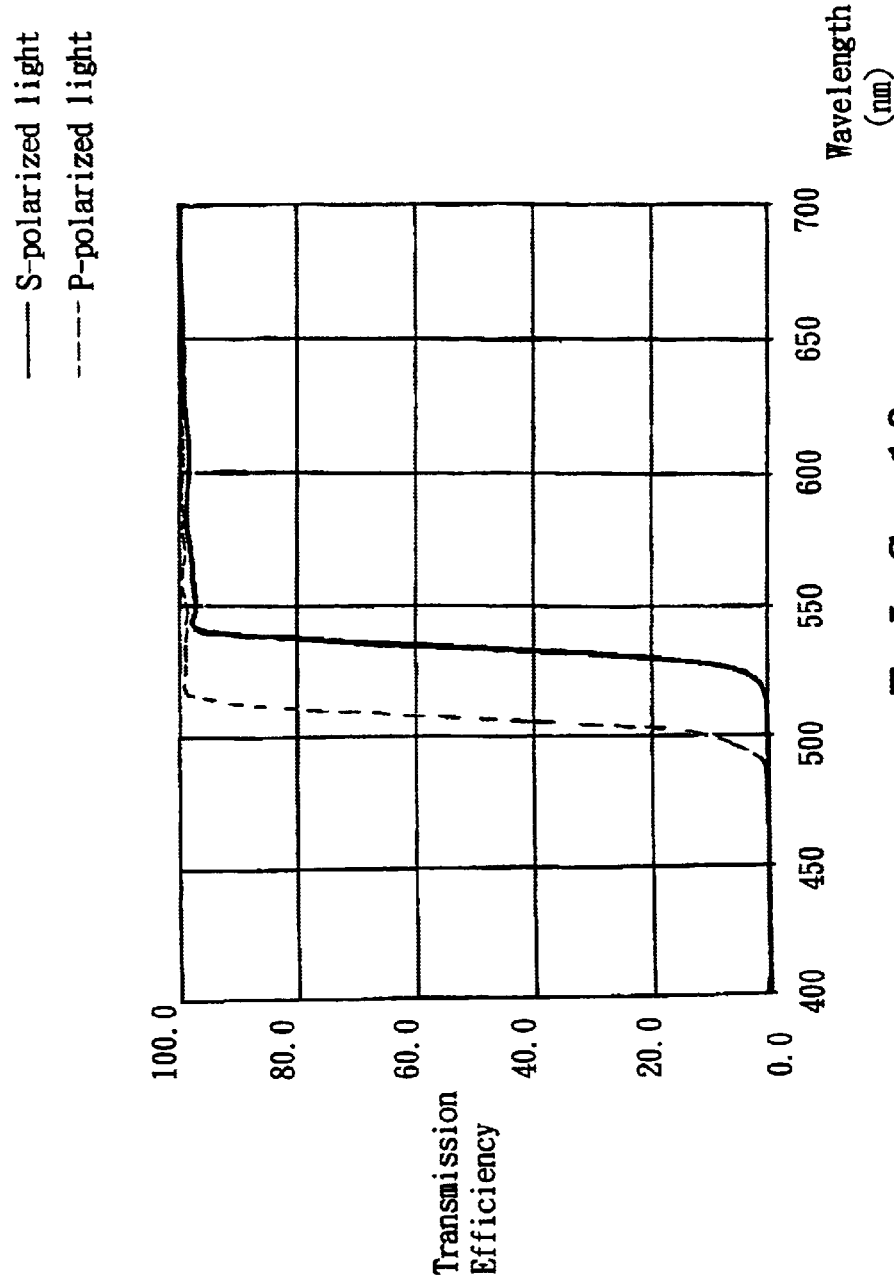
FIG. 10 illustrates the behavior of a fourth dichroic mirror used in the second preferred embodiment shown in FIG. 9.

FIG. 9 illustrates the second preferred embodiment of a light source 4 for an image projector system according to the present invention. Like the previous embodiment, the housing 40 of the light source 4 of this embodiment is formed with a light-transmissive output port 401 and first to fourth light-transmissive input ports 402 to 405. However, the housing 40 is further formed with a fifth light-transmissive input port 406 located at a left portion of the lower lateral side of the housing 40. In this embodiment, first to fifth light emitting diode modules 42 to 46 are mounted externally of the housing 40 adjacent to a respective one of the light-transmissive input ports 402 to 406. The light emitting diode modules 42, 43, 45 are similar to the light emitting modules 12, 13, 15 of the light source 1 shown in FIG. 1, respectively. The light emitting diode module 46 generates a green light beam output having a wavelength band with a center wavelength of around 515 nanometers. The light emitting diode module 44 also generates a green light beam output but having a wavelength band with a center wavelength of around 545 nanometers. Aside from the first to third dichroic mirrors (DM1, DM2, DM3) of the light source 1 of the previous embodiment, the light source 4 of the present embodiment further includes a fourth dichroic mirror (DM4), which is disposed in the housing 40, and which is adjacent to and is inclined at a 45-degree angle relative to the light-transmissive input ports 404, 406. With further reference to FIG. 10, in general, the fourth dichroic mirror (DM4) allows s-polarized light having a wavelength greater than 535 nanometers to pass therethrough, and allows p-polarized light having a wavelength greater than 505 nanometers to pass therethrough. Since the center wavelength of the wavelength band of the light beam output of the green light emitting diode module 46 is around 515 nanometers, the light beam output of the green light emitting diode module 46 can be processed with the use of a polarization state converter (not shown) so that the fourth dichroic mirror (DM4) is able to reflect the same toward the third dichroic mirror (DM3). On the other hand, since the center wavelength of the wavelength band of the light beam output of the green light emitting diode module 44 is around 545 nanometers, the fourth dichroic mirror (DM4) allows the light beam output of the green light emitting diode module 44 to pass therethrough regardless of the polarization state of the same. The fourth dichroic mirror (DM4) is thus able to direct the light beam outputs of the green light emitting diode modules 44, 46 toward the third dichroic mirror (DM3).

Since the intensity of green light plays an important role in the perception of light intensity as a whole, the inclusion of two green light emitting diode modules 44, 46 in the light source 4 of this invention results in an increase in the light intensity of the light source 4.

Preferably, a lens array integrator 47 is disposed along each optical path between the first and second dichroic mirrors (DM1, DM2), between the fourth and third dichroic mirrors (DM4, DM3), and between the third and second dichroic mirrors (DM3, DM2) for enhancing light convergence.

FIG. 11 illustrates the third preferred embodiment of a light source 5 according to the present invention, which is a modification of the second preferred embodiment. Unlike the embodiment of FIG. 9, each of fifth and sixth dichroic mirrors (DM5, DM6) cooperates with a respective one of the first and fourth dichroic mirrors (DM1, DM4) to form a cross-type dichroic mirror set. In this way, p-polarized incident light from the light emitting diode modules 52, 56 can be intercepted and reflected by a corresponding one of the fifth and sixth dichroic mirrors (DM5, DM6) toward the second dichroic mirror (DM2) or the third dichroic mirror (DM3), thereby eliminating the need for performing polarization state conversion.

Moreover, the embodiment of FIG. 9 may be further modified by forming a sixth light-transmissive input port at a right portion of the upper lateral side of the housing. A sixth light emitting diode module having a blue light beam output with a shortest center wavelength may be mounted externally of the housing adjacent to the sixth light-transmissive input port. Another dichroic mirror may be added to cooperate with the second dichroic mirror (DM2) to form a cross-type dichroic mirror set for light integration. The modified light source as such thus includes one red light emitting diode module, two green light emitting diode modules, and three blue light emitting diode modules.

As shown in FIG. 12, the light source 5 of this invention can be used to replace a conventional high-voltage mercury lamp in an image projector system 60. The light emitted by the light source 5 of this invention will be separated into three primary color components by a color splitter for processing by a respective liquid crystal modulator that includes a polarization state converter, a polarizer, a modulator and an analyzer. The modulated primary color components are then synthesized by a color synthesizer before being projected onto a screen by a projector lens set. When the light source of this invention is installed in an image projector system, power conversion and light utilization efficiency are improved, and heat generation can be reduced. Moreover, ultraviolet and infrared components are also reduced to a minimum to avoid damaging optical parts of the image projector system. In addition, the service life of light emitting diodes is far longer than that of the high-voltage mercury lamp, thus resulting in easier maintenance and cost savings.

Referring to FIG. 13, with the use of a clock control device (not shown), the light emitting diode modules of the light source 5 can be sequentially activated in a single light-emitting cycle, such as R→(G1+G2)→(B1+B2). In this way, each of the colored light beam outputs can take turns in passing through a polarization state converter 61, a polarizer 62 and a polarized beam splitter 63, in being modulated by a liquid crystal modulator 64, and in being reflected for passage through an analyzer 65 via the polarized beam splitter 63 so as to be subsequently projected onto a screen (not shown) by a projector lens set 66. In this manner, the image data of three separated primary colors, e.g., red, green and blue, are rebuilt in accordance with the clock control process so as to achieve the effect of display of color images by virtue of persistence of vision in human eyes and overlapping of the three sets of colored image data on the same screen. During the light-emitting cycles, semiconductor diodes not scheduled for light emission are disconnected temporarily from the electric power source for the purpose of lowering the operating temperature, thereby ensuring that the ambient temperature will not be too high. It should be noted herein that, instead of the liquid crystal modulator, it is possible to use a digital micro-mirror device (DMD) for light modulation in the image projector system of this invention.

FIG. 14 illustrates another image projector system that incorporates the light source 5 of this invention. Unlike the image projector system of FIG. 13, the polarized light splitter 63' is in the form of a lens, i.e., the polarized light splitter 63' is not a prism, that allows passage of s-polarized light and that reflects p-polarized light.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A light source for an image projector system, said light source comprising:

a rectangular housing formed with a light-transmissive output port and at least four light-transmissive input ports;

at least four light emitting diode modules, each of which is mounted externally of said housing adjacent to a respective one of said light-transmissive input ports, each of said light emitting diode modules generating a light beam output that is transmitted into said housing through the respective one of said light-transmissive input ports, the light beam output of each of said light emitting diode modules having a wavelength band within a range of from 400 to 700 nanometers, the wavelength bands of the light beam outputs of said light emitting diode modules being different from each other, wherein a center wavelength of the wavelength band of the light beam output of each of said light emitting diode modules is spaced apart from that of other ones of said light emitting diode modules by at least 20 nanometers; and a mirror set mounted in said housing for directing the light beam outputs of said light emitting diode modules that are transmitted into said housing to pass through said light-transmissive output port.

2. The light source as claimed in claim 1, wherein said mirror set includes a plurality of dichroic mirrors, each of which reflects incident light or allows passage of incident light therethrough depending on whether wavelength of the incident light is shorter or longer than a corresponding wavelength boundary point of said dichroic mirror.

3. The light source as claimed in claim 2, wherein the wavelength band of the light beam output of at least one of said light emitting diode modules has upper and lower limits, at least one of which is controlled by the wavelength boundary point of one of said dichroic mirrors.

4. The light source as claimed in claim 2, wherein said mirror set further includes at least one lens array integrator disposed along an optical path between one of said light-transmissive input ports and said light-transmissive output port.

5. The light source as claimed in claim 2, wherein said light-transmissive output port is disposed on one side of said housing that is different from said light-transmissive input ports.

6. The light source as claimed in claim 5, wherein three of said light-transmissive ports are disposed on three different sides of said housing, respectively, each of said dichroic mirrors being disposed adjacent to and being inclined relative to at least one of said light-transmissive input and output ports.

7. The light source as claimed in claim 1, wherein each of said light emitting diode modules includes a plurality of diodes, light beams generated by said diodes in a same one of said light emitting diode modules having a substantially uniform wavelength band.

8. The light source as claimed in claim 1, wherein each of said light emitting diode modules includes:

a substrate having a front side formed with an array of diode receiving cavities; and an array of light emitting semiconductor diodes, each of which is mounted in a respective one of said cavities.

9. The light source as claimed in claim 8, wherein each of said semiconductor diodes has first and second diode terminals, said substrate being made of ceramic, said front side of said substrate being formed with a first circuit connected electrically to said first diode terminals of said semiconductor diodes, and a second circuit connected electrically to said second diode terminals of said semiconductor diodes.

10. The light source as claimed in claim 8, wherein each of said cavities is formed with a reflective layer, said substrate further having a rear side formed with a plurality of holes that extend respectively toward said reflective layers in said cavities, each of said light emitting diode modules further including a heat dissipating member mounted on said rear side of said substrate and extending into said holes in said substrate to establish thermal conduction with said reflective layers in said cavities.

11. The light source as claimed in claim 1, wherein the light beam output of one of said light emitting diode modules corresponds to a red color output, the light beam output of at least one of said light emitting diode modules corresponding to a green color output, the light beam output of more than one of said light emitting diode modules corresponding to a blue color output.

12. The light source as claimed in claim 1, wherein said light emitting diode modules are sequentially activated in a single light-emitting cycle.

13. A light emitting diode module comprising:

a substrate having front and rear sides, said front side being formed with an array of diode receiving cavities, each of said cavities being formed with a reflective layer, said rear side being formed with a plurality of holes that extend respectively toward said reflective layers in said cavities;

an array of light emitting semiconductor diodes, each of which is mounted on said reflective layer of a respective one of said cavities in said front side of said substrate; and a heat dissipating member mounted on said rear side of said substrate and extending into said holes in said substrate to establish thermal conduction with said reflective layers in said cavities.

14. The light emitting diode module as claimed in claim 13, wherein each of said semiconductor diodes has first and second diode terminals, said substrate being made of ceramic, said front side of said substrate being formed with a first circuit connected to said first diode terminals of said semiconductor diodes, and a second circuit connected to said second diode terminals of said semiconductor diodes.

15. An image projector system including a light source, a light-modulating device for modulating light generated by said light source, and a projector lens set for projecting modulated light from said light-modulating device onto a screen, wherein said light source includes:

a rectangular housing formed with a light-transmissive output port and at least four light-transmissive input ports;

at least four light emitting diode modules, each of which is mounted externally of said housing adjacent to a respective one of said light-transmissive input ports, each of said light emitting diode modules generating a light beam output that is transmitted into said housing through the respective one of said light-transmissive input ports, the light beam output of each of said light emitting diode modules having a wavelength band within a range of from 400 to 700 nanometers, the wavelength bands of the light beam outputs of said light emitting diode modules being different from each other, wherein a center wavelength of the wavelength band of the light beam output of each of said light emitting diode modules is spaced apart from that of other ones of said light emitting diode modules by at least 20 nanometers;

the light beam output of one of said light emitting diode modules corresponding to a red color output, the light beam output of one of said light emitting diode modules corresponding to a green color output, the light beam output of one of said light emitting diode modules corresponding to a blue color output; and a mirror set mounted in said housing for directing the light beam outputs of said light emitting diode modules that are transmitted into said housing to pass through said light-transmissive output port for processing by said light-modulating device.

16. The image projector system as claimed in claim 15, wherein said light-modulating device includes a liquid crystal modulator.

17. The image projector system as claimed in claim 15, wherein said mirror set includes a plurality of dichroic mirrors, each of which reflects incident light or allows passage of incident light therethrough depending on whether wavelength of the incident light is shorter or longer than a corresponding wavelength boundary point of said dichroic mirror.

18. The image projector system as claimed in claim 17, wherein:

said mirror set further includes at least one lens array integrator disposed along an optical path between one of said light-transmissive input ports and said light-transmissive output port;

said light-transmissive output port is disposed on one side of said housing that is different from said light-transmissive input ports;

three of said light-transmissive ports are disposed on three different sides of said housing, respectively; and each of said dichroic mirrors is disposed adjacent to and is inclined relative to at least one of said light-transmissive input and output ports.

19. The image projector system as claimed in claim 15, wherein each of said light emitting diode modules includes a plurality of diodes, light beams generated by said diodes in a same one of said light emitting diode modules having a substantially uniform wavelength band.

20. The image projector system as claimed in claim 15, wherein each of said light emitting diode modules includes:

a substrate having a front side formed with an array of diode receiving cavities; and an array of light emitting semiconductor diodes, each of which is mounted in a respective one of said cavities.

21. The image projector system as claimed in claim 20, wherein each of said cavities is formed with a reflective layer, said substrate further having a rear side formed with a plurality of holes that extend respectively toward said reflective layers in said cavities, each of said light emitting diode modules further including a heat dissipating member mounted on said rear side of said substrate and extending into said holes in said substrate to establish thermal conduction with said reflective layers in said cavities.

* * * * *